United States Patent [19]

Kumazawa

[11] 3,887,825

[45] June 3, 1975

[54] CONTROL APPARATUS FOR AN INTERMITTENTLY ROTATED INDEXED WHEEL

[75] Inventor: Shoichiro Kumazawa, Kamagaya, Japan

[73] Assignee: Kabushiki Kaisha Seikosha, Japan

[22] Filed: Feb. 22, 1974

[21] Appl. No.: 444,793

[30] Foreign Application Priority Data
Mar. 6, 1973  Japan.............................. 48-27252

[52] U.S. Cl................................ 310/37; 58/28 D
[51] Int. Cl. ............................................ H02k 33/00
[58] Field of Search........ 58/23 D, 280, 116 R, 855; 310/37, 49

[56] References Cited
UNITED STATES PATENTS 3,079,517  2/1963  Straub................................ 310/37
3,645,089  2/1972  Yamada............................. 58/28 D
3,719,839  3/1973  Endo................................... 310/49

Primary Examiner—Donovan F. Duggan
Attorney, Agent, or Firm—Robert E. Burns; Emmanuel J. Lobato; Bruce L. Adams

[57] ABSTRACT

A driven or indexed wheel for a timepiece driven step-by-step by a balance staff of a timepiece. A rockably supported level has a pawl thereon resiliently biased rotationally by a free end of a spring lever to engage peripheral teeth on a lock wheel that is fixed to the wheel driven stepwise. The force applied by the spring lever can be varied while maintaining precise positioning of the indexed wheel as it steps rotationally.

2 Claims, 3 Drawing Figures

CONTROL APPARATUS FOR AN INTERMITTENTLY ROTATED INDEXED WHEEL

BACKGROUND OF THE INVENTION

The present invention relates generally to timepieces and more particularly to a controlling apparatus for stopping an intermittently rotatable wheel at a predetermined position.

In a known indexing mechanism, a drive piece connected to a balance staff imparts impulses to pins or an indexing wheel, and a lock means is employed for stopping the indexing wheel at a predetermined position after each incremental rotation. The lock means comprises a lock wheel connected to the intermittently rotatable wheel and a lever spring. The level spring is rotatably supported at one end portion and the other end portion is free and engaged with the lock wheel to stop it at predetermined position by the spring force of the lever spring. When the spring force is too strong, stronger power is required for the drive piece to impulse pins on the indexing wheel, whereas, when the spring force is too weak, it is difficult to stop the indexing wheel at the predetermined positions. Therefore, it is necessary to control the pressure of the lever spring to a proper degree. To control the pressure of the lever spring against the lock wheel, the lever spring is turned at its supported portion which changes the deflection of the lever spring. The change of deflection of the lever spring effects a little shift of the free end portion of the lever spring. Therefore the stop position of the indexing wheel changes and the mutual positional relation between the pins of the indexing wheel and the drive piece also changes. Consequently, the driving of the indexing wheel becomes unstable and each individual step of rotation by the drive piece is not long enough for the wheel to rotate in a proper intermittent manner. Further, since the length of the lever spring and the shape of the free end portion of the lever spring imparts delicate influence to the stop position of the indexing wheel, it is difficult to manufacture such lock means.

SUMMARY OF THE INVENTION

The present invention provides a novel and improved controlling apparatus for an intermittently rotatable wheel.

A feature of the present invention, is provision of a controlling apparatus for an intermittently rotatable wheel comprising an intermittently rotatable wheel having a toothed lock wheel connected coaxially thereto. A lock lever rockably supported and provided with a pawl engages the teeth of the lock wheel to control precise step-by-step rotation thereof. A lever spring applies controllable rotary force in a predetermined direction to the lock lever to precisely control the indexing of the rotatable wheel.

One object of the present invention is to provide a controlling apparatus for an intermittently rotatable wheel in which the wheel is steadily stopped at predetermined positions after each intermittent rotation thereof without affecting the stop position of the wheel.

BRIEF DESCRIPTION OF THE DRAWINGS

The above objects, other objects and characteristic features of the present invention will become evident and will be more readily understood from the following description and claims in conjection with the accompanying drawings, in which:

DESCRIPTION OF A PREFERRED EMBODIMENT

Figure 1:
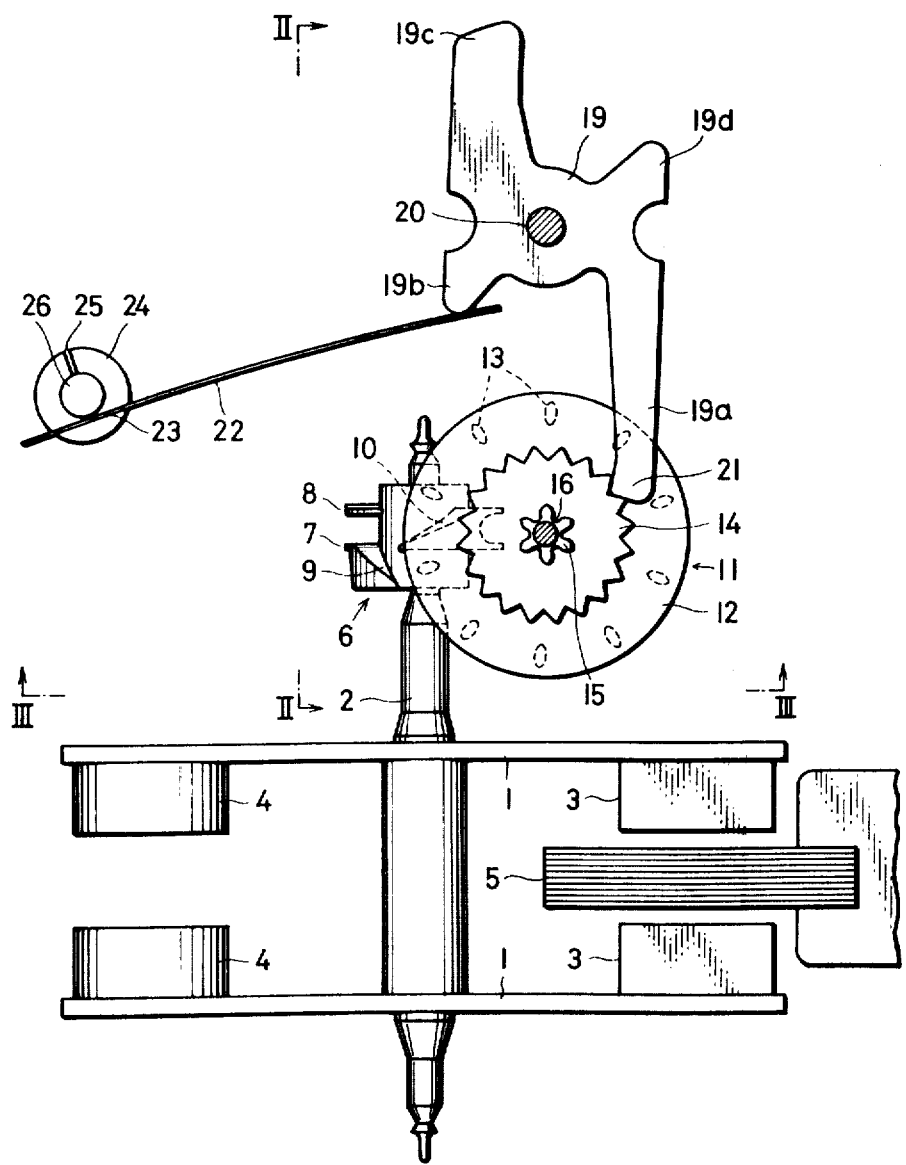
FIG. 1 is a sectional elevation view of an embodiment of an apparatus according to the present invention.
Figure 2:
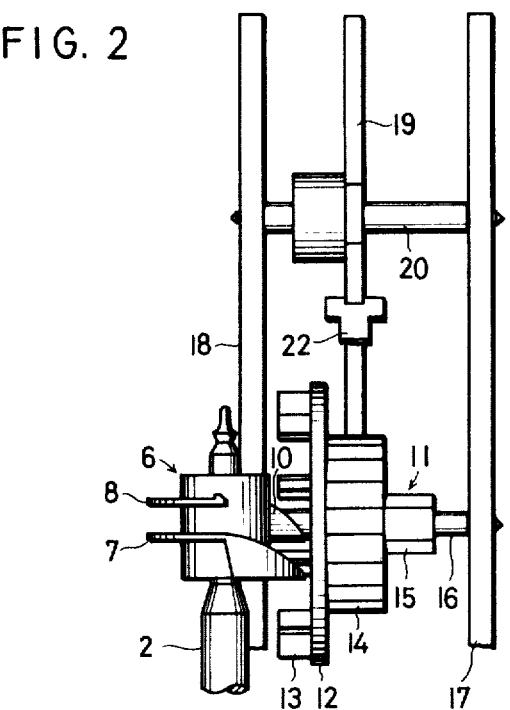
FIG. 2 is a sectional view of the apparatus taken along section line II—II in FIG. 1.
Figure 3:
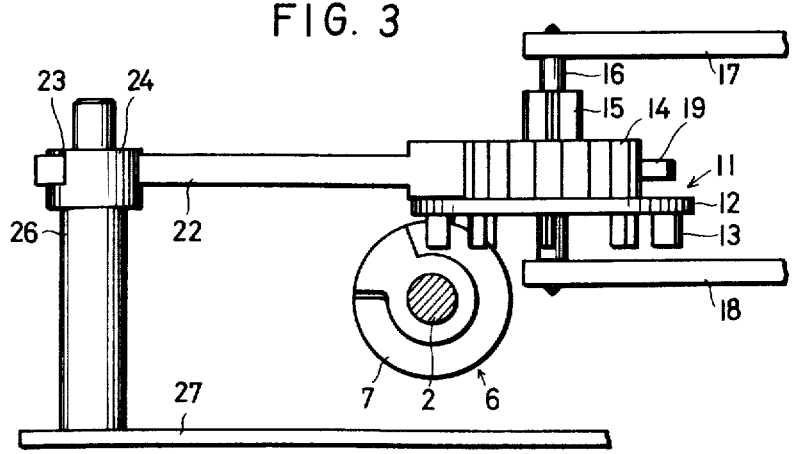
FIG. 3 is a section view taken along section lines III—III in FIG. 1.

Referring now to the drawings, balance wheels 1, 1' are mounted spaced axially on a balance staff 2. Each balance wheel carries a drive magnet 3, 3' and a balance weight or mass 4, 4'. The drive magnets 3, 3' face each other and an electrically energized drive coil 5 of an electromagnetic drive mechanism is provided in the space between the drive magnets 3, 3'. A drive piece 6 is mounted on the balance staff 2. The drive piece 6 is provided with two ribs 7 and 8 axially spaced from each other. The ribs 7 and 8 are respectively provided with tapered impulse surfaces 9 and 10.

An indexing wheel structure 11 comprises an indexing wheel 12 provided with perpendicular pins 13 on a face thereof and spaced from one another circumferentially at equal distances in a circle; a toothed lock wheel 14 connected to the indexing wheel 12; an indexing wheel pinion 15 coaxial therewith; and an indexing wheel arbor 16 also coaxial rotatably supported between an upper plate 17 and a middle plate 18. The pins 13 are so positioned that they may be rotated by the drive piece 6 with the impulse surfaces 9 and 10. A lock lever 19 is mounted on a lock lever arbor 20. This lock lever arbor 20 is rotatably supported between the upper plate 17 and the middle plate 18. The lock lever 19 has four arms 19a, 19b, 19c and 19d extending from a central portion. Two arms, 19c and 19d, are provided for balancing so that the center of gravity of the lock lever may coincide with the center of the lock lever arbor 20. A pawl 21 is formed at the end of the arm 19a. The pawl 21 engages peripheral teeth of the lock wheel 14.

A lever 22 presses the arm 19b with a free end portion to apply rotary power or bias to the lock lever 19 in a clockwise direction. Thus the pawl 21 elastically engages the periheral teeth of the lock wheel 14. The other end portion of the lever spring 22 is force fitted into a slit 23 provided in a collet 24. The collet 24 is provided with a cutout 25 extending from the periphery to the hollow of the collet. The collet 24 is secured to a pin 26 which is fixed on a base plate 27. In order to secure the collet 24 to the pin 26, the cutout 25 is spread with a screw driver or the like and the collet 24 is set about the pin 26, and then the collet cutout is returned to the original state and the collet is secured to the pin 26.

In operation the balance wheels 1, 1' are rotated in reciprocable motion by the electromagnetic mechanism and the drive piece 6 intermittently roates the indexing wheel 12 impulsing the pins 13 with the impulse surfaces 9 and 10. The lock lever 19 itself has no spring power. However, since the lock lever is applied with a rotary bias by the lever spring 22, the pawl 21 is always elastically engaged with the lock wheel 14 at a predetermined position. Thus the indexing wheel 12 is stopped at an exact position after each intermittent rotation.

In order to control the pressure to the lock wheel 14 applied by the lock lever 19, the cutout 25 in the collet 24 is spread and the collet 24 is angularly turned about the pin 26. When the collet 24 is turned in a counterclockwise direction, the free end portion of the lever spring 22 presses the lock lever 19 and the pressing force applied by the lock lever 19 against the lock wheel 14 increases. On the contrary, when the collet 24 is turned in a clockwise direction, the pressing force of the lock lever 19 against the lock wheel 14 descreases. In any case, the position of engagement between the lock wheel 14 and the pawl 21 does not shift. Accordingly, the stop position of the indexing wheel 12 does not change at any time and the propositional relation between the pins 13 and the impulse surfaces 9 and 10 is kept unchanged.

What I claim and desire to secure by letters patent:

1. In combination, a driven wheel driven stepwise, means to insure said wheel is driven precise angular increments comprising a toothed lock wheel having peripheral teeth and driven synchronously with said driven wheel and fixed thereto, a lock lever rockably supported on its center of gravity and having a pawl engaging the teeth of said lock wheel to control the incremental rotation of said lock wheel and said wheel driven stepwise, said lock lever having plurality of balancing arms insuring its balance on its center of gravity means supporting said lock lever at its center of gravity, a lever spring having a free end applying a rotational force to said lock lever to resiliently apply said pawl into engagement with said teeth of the lock wheel, and a turnable collet holding another end portion of said lever spring for variably controlling the pressure said lever spring applies against said lock lever.

2. The combination according to claim 1, including a driven balance staff having means driving said driven wheel comprising balance wheels, and an electromagnetic mechanism driving said balance wheels.

* * * * *